(12) United States Patent
Gotou et al.

(10) Patent No.: US 7,123,481 B2
(45) Date of Patent: Oct. 17, 2006

(54) ELECTRONIC DEVICE

(75) Inventors: Akihiro Gotou, Hitachinaka (JP);
Tomomi Okamoto, Yokohama (JP);
Tetsuji Kawamata, Hitachinaka (JP);
Keiichi Tadokoro, Mito (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 10/445,815

(22) Filed: May 28, 2003

(65) Prior Publication Data
US 2004/0125560 A1 Jul. 1, 2004

(30) Foreign Application Priority Data
Dec. 26, 2002 (JP) ............................. 2002-375853

(51) Int. Cl.
*H05K 7/20* (2006.01)
*H04N 5/225* (2006.01)
(52) U.S. Cl. ............... 361/704; 361/707; 361/714; 361/720; 361/831; 348/374
(58) Field of Classification Search ........... 361/704, 361/707, 711, 687, 714, 720, 816, 818, 600, 361/679, 800, 715, 690; 312/223.1; 396/431, 396/542; 165/80.3; 386/117, 125; 348/373–376, 348/335, 340
See application file for complete search history.

(56) References Cited
U.S. PATENT DOCUMENTS 5,990,983 A * 11/1999 Hargis et al. ............... 348/758
5,999,406 A * 12/1999 McKain et al. ............. 361/704
6,092,728 A *  7/2000 Li et al. ..................... 235/454
6,320,748 B1 * 11/2001 Roden et al. ............... 361/704
6,452,797 B1 *  9/2002 Konstad ..................... 361/695
6,466,441 B1 * 10/2002 Suzuki ....................... 361/695
6,680,848 B1 *  1/2004 Petit et al. .................. 361/704

FOREIGN PATENT DOCUMENTS

| JP | 50-26069    | 3/1975    |
| JP | 11-112923   | 4/1999    |
| JP | A-11-249214 | 9/1999    |
| JP | 2001308569  | * 11/2001 |
| JP | 2003-074798 | 5/2003    |

* cited by examiner

*Primary Examiner*—Lisa Lea-Edmonds
*Assistant Examiner*—Zachary Pape
(74) *Attorney, Agent, or Firm*—Antonelli, Terry, Stout and Kraus, LLP.

(57) ABSTRACT

An electronic device including: a circuit board with an electronic circuit; a heat conductor to conduct heat generated in the electronic circuit; an electronic element to be used under an ambient temperature lower than a temperature of the heat conductor heated by heat generated in the electronic circuit; and a support to support the circuit board, the heat conductor, and the electronic element, wherein the support is positioned between the heat conductor and the electronic element so that a first plane of projection of the heat conductor on the support and a second plane of projection of the heat conductor on the support do not overlap with each other.

7 Claims, 10 Drawing Sheets

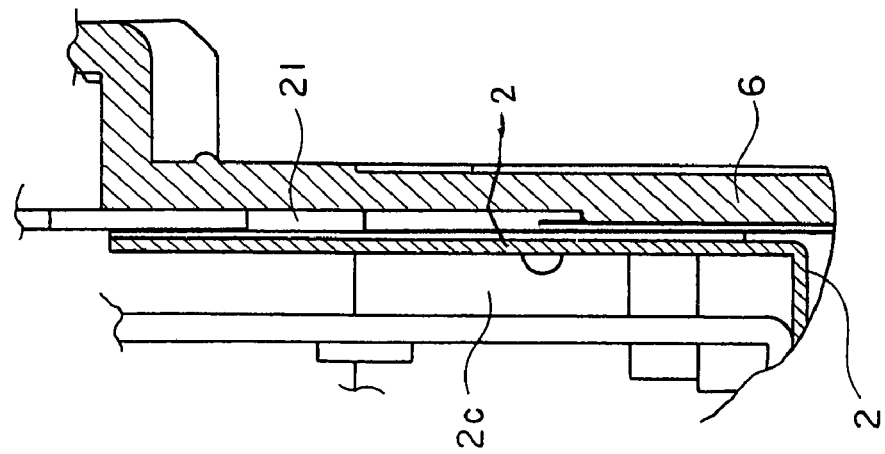
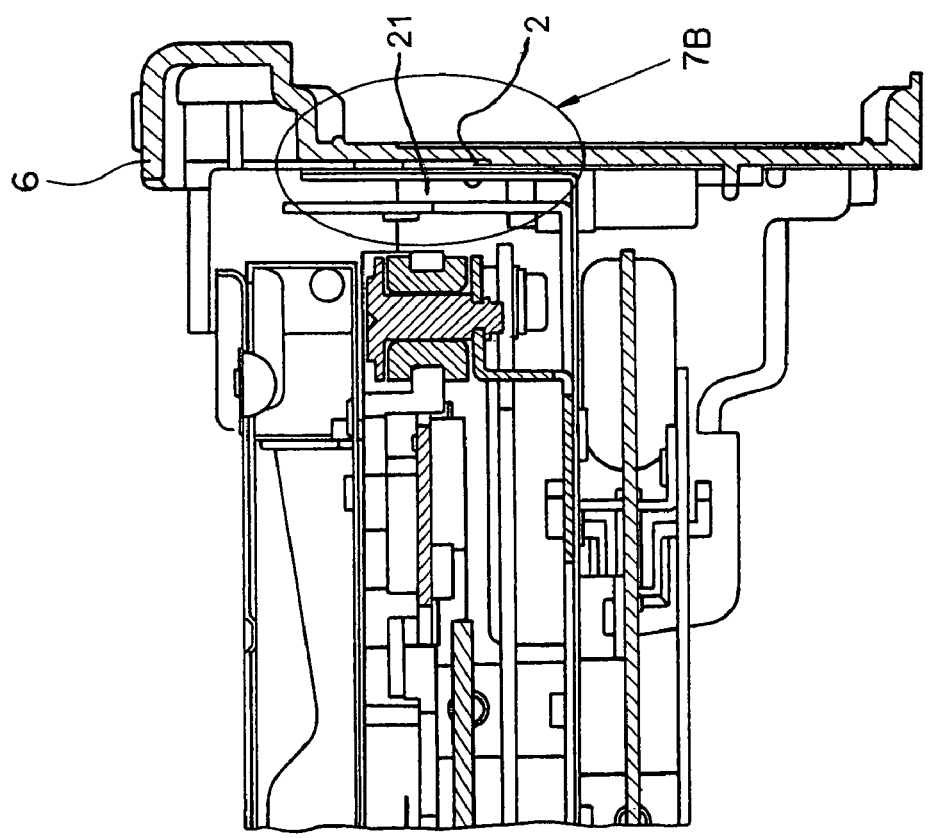

ELECTRONIC DEVICE

BACKGROUND OF THE INVENTION

The present invention relates to an electronic device comprising an electronic element which generates heat during operation and another electronic element to be used under an ambient temperature lower than a temperature caused by heat irradiated from the heat generating element.

As a prior art, for example, there is proposed a support structure in JP-A-11-249214, which comprises a support plate on one side surface of which a circuit board is mounted and the other side surface of which a structural body sensitive to heat is mounted, wherein the support plate is composed of two metal plates, having different thermal conductivities from each other, which are arranged so as to oppose to each other and electrically connected with each other, and wherein the circuit board is mounted on one side of the higher conductivity plate opposite to the other side facing the lower conductivity plate and the structural body is mounted on one side of the lower conductivity plate opposite to the other side facing the higher conductivity plate.

SUMMARY OF THE INVENTION

In the prior art construction, some distance is retained between the circuit board and the structural body. However, there is a need that desirably the distance between the circuit board and the structural body is as small as possible.

In the prior art construction, further there is a need that the metal plate having higher thermal conductivity has to possess enough strength in order to mount the circuit board thereon. Therefore, the metal plate having higher thermal conductivity has to be produced from a specific restricted material.

In the prior art construction, there is a problem that the metal plate having higher conductivity is required to be thick.

In the prior art construction, there is also a problem that a heat dissipating part of the electronic device becomes a higher temperature than that of the other remaining parts of the electronic device.

Thus, an object of the present invention is to solve the above problems.

Another object of the present invention is to downsize electronic devices.

Under the above objects, according to the present invention, there is provided an electronic device comprising an electronic element which generates heat during operation and another electronic element to be used under an ambient temperature lower than a temperature caused by heat irradiated from the heat generating element, wherein the electronic device comprises a support means to support a housing of the electronic device, and a heat conducting means being arranged between the support means and the heat generating element to conduct heat irradiated from the heat generating element.

Other objects, features and advantages of the invention will become apparent from the following description of the embodiments of the invention taken in conjunction with the accompanying drawings.

BRIEF DESCRIPTION OF THE DRAWINGS

FIG. 7A is a transverse cross-sectional view of the DVD camera according to the invention;

FIG. 7B is a partial enlargement of FIG. 7A as indicated by arrow 7B;

DETAILED DESCRIPTION OF THE PREFERRED EMBODIMENTS

Herein below preferred embodiments will be described.

In the preferred embodiments, the electronic device is a DVD camera, a component mounted on a board generates heat during operation, and a laser to read/write data on a DVD is an electronic component having a maximum operational temperature lower than that elevated by the heat generating component mounted on the board. The invention, however, is not limited to this application and can be incorporated in other electronic devices comprising an electronic element which generates heat during operation and another element having a maximum operational temperature lower than that elevated by the heat generating element including, but are not limited to, video tape cameras, HDD cameras, memory cameras, optomagnetic disk cameras, data read/write devices and the like.

Figure 1:
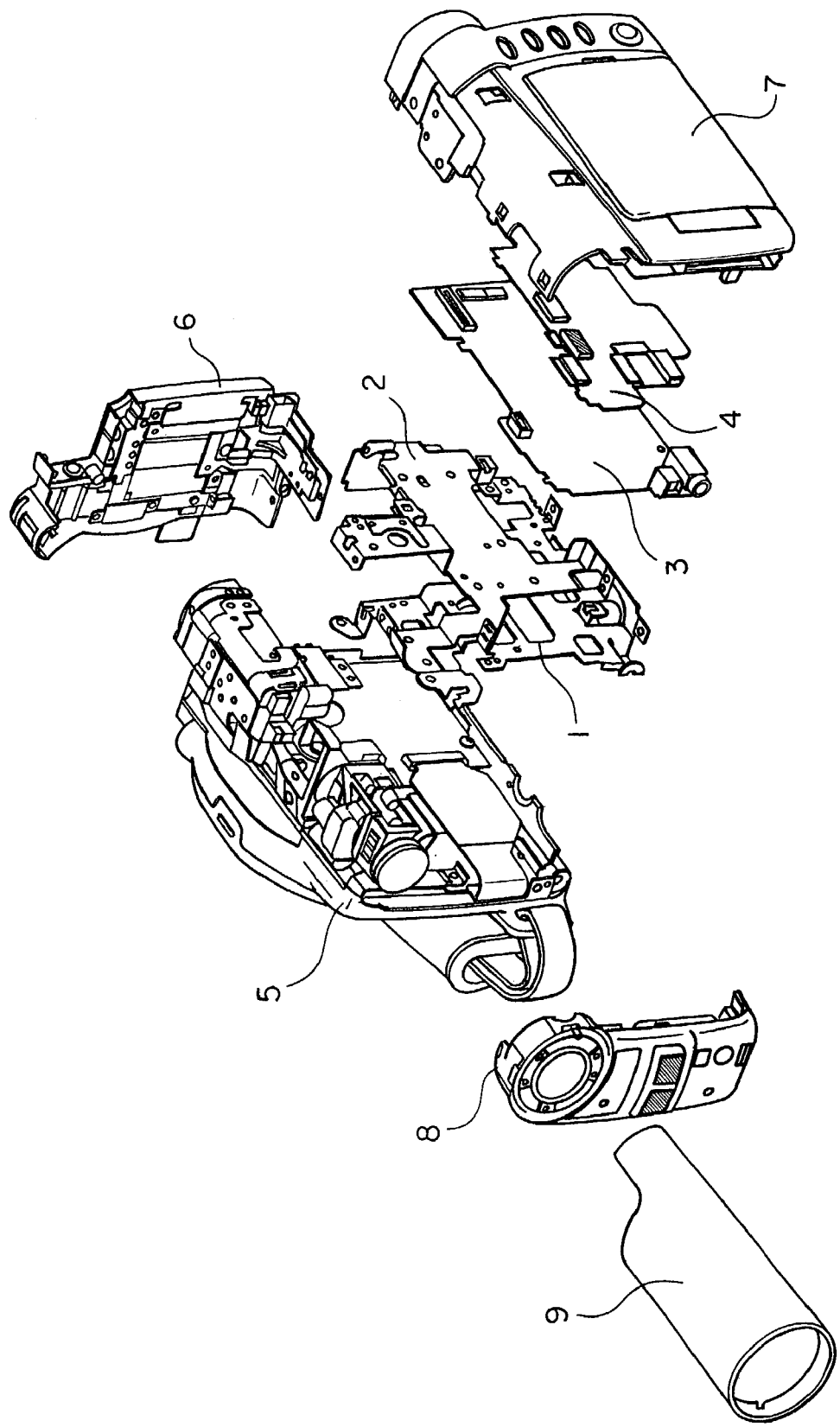
FIG. 1 is a exploded perspective view showing components of a DVD camera according to the invention.

FIG. 1 is an exploded perspective view showing a component arrangement of a DVD camera embodying the present invention. Referring to FIG. 1, major components of the DVD camera will be described. A frame 1 and a heat conducting member 2 fixed to the frame 1 are disposed between a right case 5 and a board 3 juxtaposing a board 4 outside the board 3. The assembly is further covered with a front case 8, a cover 9, a rear case 6, and a left case 7 for completion.

A disk drive for an optical disk is fabricated in the right case 5, and a laser of an optical pick-up device in the disk drive is an element sensitive to elevated temperatures. The board 3 carries an element which generates heat during operation. An arrangement is made such that heat generated by the element on the board 3 is conducted effectively to outer members via the heat conducting member 2. Furthermore, the heat conducting member 2 is arranged so as to be apart from the laser of the disk drive. More specifically, an arrangement to secure prescribed distances between the laser and the heat generating element in three dimensions (straight distance from laser) and shorten the space between the disk drive and the heat conducting member 2 enables the reduction in thickness of the DVD camera. Details of this feature will hereinafter be described in order.

Figure 2:
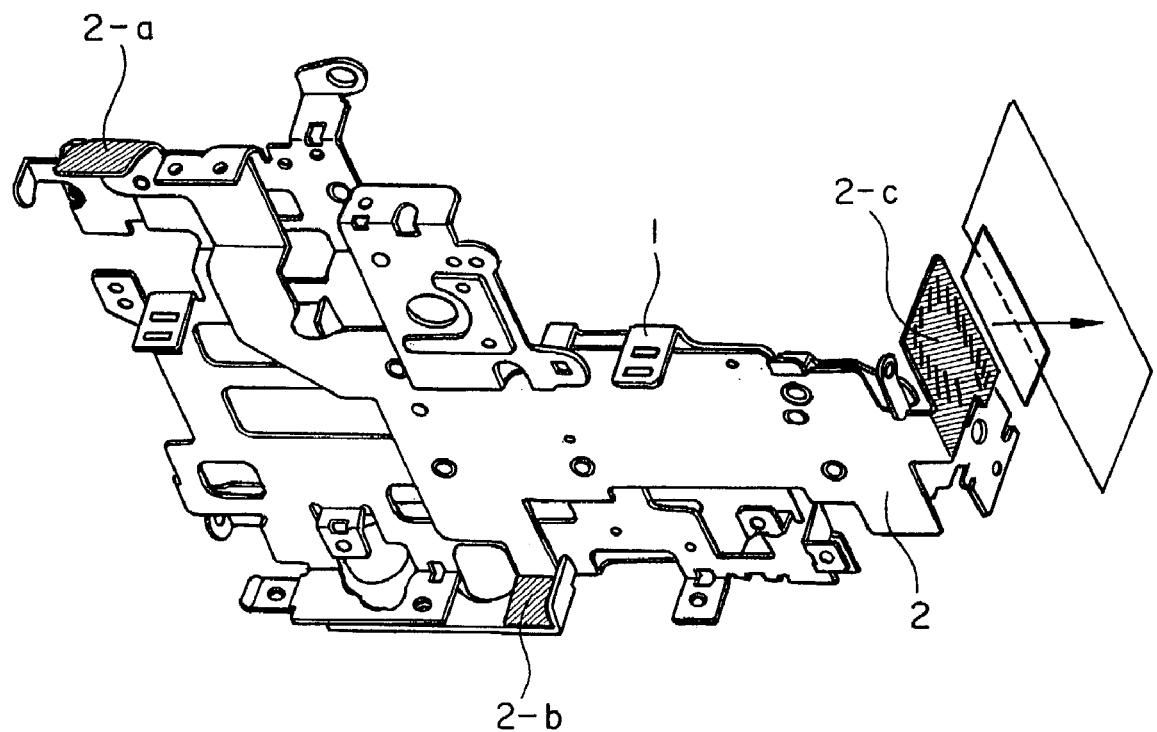
FIG. 2 is a perspective view of an assembly of a heat conducting member and a frame according to the invention.

Referring to FIG. 2 showing a perspective view of an assembly of the heat conducting member 2 and the frame 1, a configuration of the heat conducting member 2 will be described. The heat conducting member 2 is jointly fixed onto the frame 1 to dispense with a specific mounting member between the heat conducting member 2 and the frame 1. The joining methods will be described later with reference to FIGS. 8 and 9.

On the heat conducting member 2, a heat conducting part 2*a*, a heat conducting part 2*b*, and a heat conducting part 2*c* to conduct heat to the outer members are disposed. By means of the three heat conducting parts 2*a*, 2*b*, 2*c* on the heat conducting member 2, internal heat created by the board 3 and the like can be conducted efficiently to the outer members. If the heat conducting parts are disposed at locations most unlikely to contact with users' hands, users may feel comfortable in operating the electronic devices. The structure for conducting internal heat to the outer members will be described with reference to FIGS. 5, 6, and 7.

Figure 3:
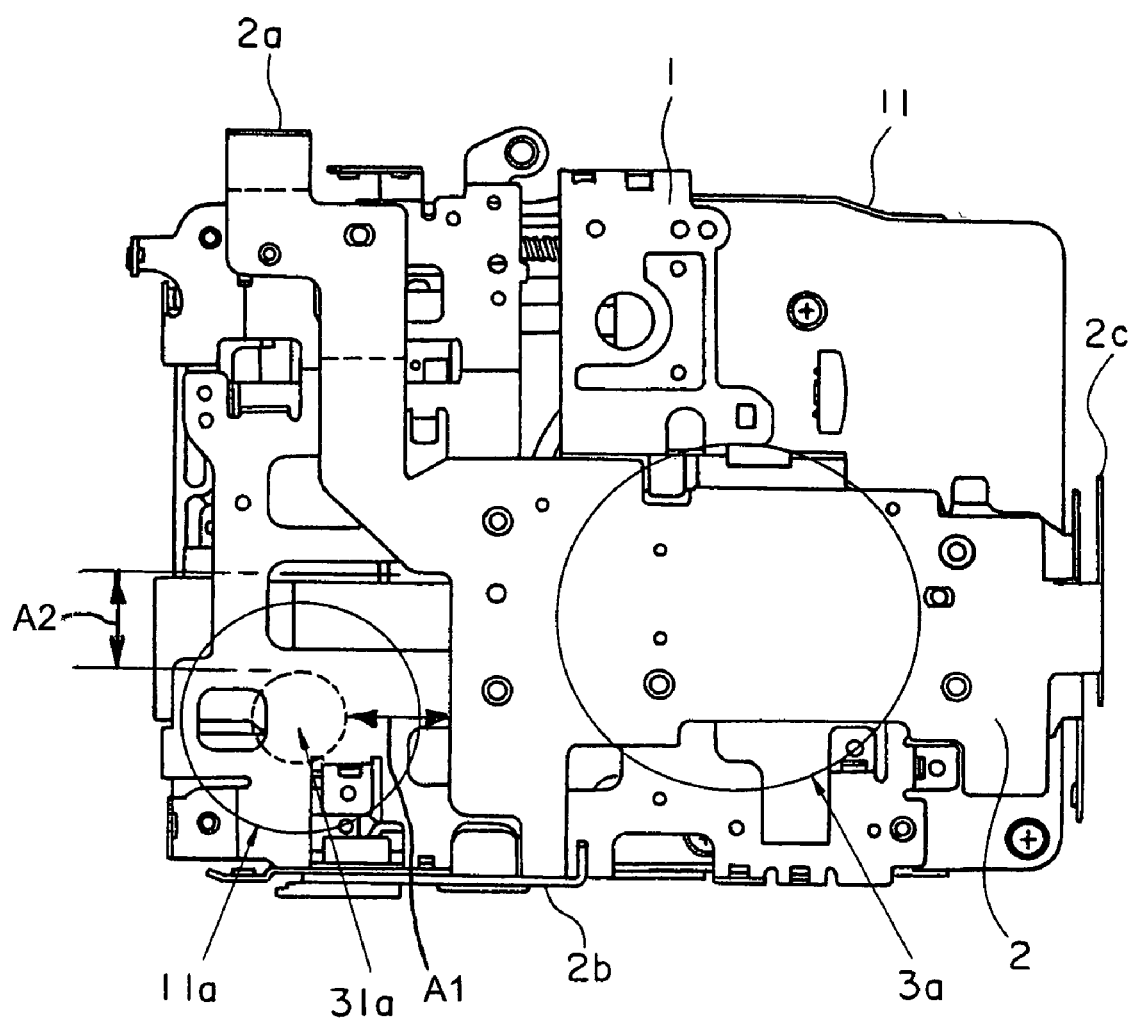
FIG. 3 is a front view of the assembly of the heat conducting member and the frame according to the invention.

Referring to FIG. 3 illustrating a front view of the assembly of the heat conducting member 2 and the frame 1, a positional relationship between the heat generating area and the laser of the disk drive will be described. The board 3 (not shown) is disposed on the front side in FIG. 3 and the heat generating element is located in an encircled area denoted a heat generating area 3*a* of board 3. The disk drive 11 is disposed on the back side in FIG. 3 and the laser sensitive to elevated temperatures is located in a dotted circle denoted a laser position 31*a*.

It is configured such that no part of the heat conducting member 2 is disposed around the laser position 31*a*, namely the area sensitive to heat (laser) 11*a*. On the other hand, the heat conducting member 2 is placed over the board at the heat generating area 3*a*.

As the temperature of the heat conducting member 2 is elevated during operation of the electronic device, the laser is arranged so as to be apart from the heat conducting member 2 to minimize a rise in temperature of the laser due to heat radiation from the heat conducting member 2. More specifically, it is arranged that the laser is spaced predetermined distances, dimensions A1 and A2, apart from the heat conducting member 2 to minimize an increase in the temperature of the laser.

The positional relationship between the laser and the heat conducting member 2 will further be described later with reference to FIG. 4. A structure to conduct heat generated at the heat generating area 3*a* of the board 3 to the heat conducting member 2 will also be explained later with reference to FIG. 5.

In the preferred embodiments, a stainless steel plate is adopted to fabricate the frame 1. Stainless steel permits the use of a thin plate providing sufficient strength and helps reduce weight of the electronic device. For the fabrication of the heat conducting member a copper plate is adopted. With its high thermal conductivity and superior machining properties, even a thin copper plate gives rise to an adequate heat conducting effect and copper is easy to be processed into various forms.

While it has been described in the preferred embodiments that the material of the frame 1 is stainless steel and that of the heat conducting member 2 is copper, the materials for the frame 1 and the heat conducting member 2 are not limited. As the heat conducting member 2 according to the invention is not required to support such structural members as a board and the like, a non-metal material like graphite can also be used.

Figure 4:
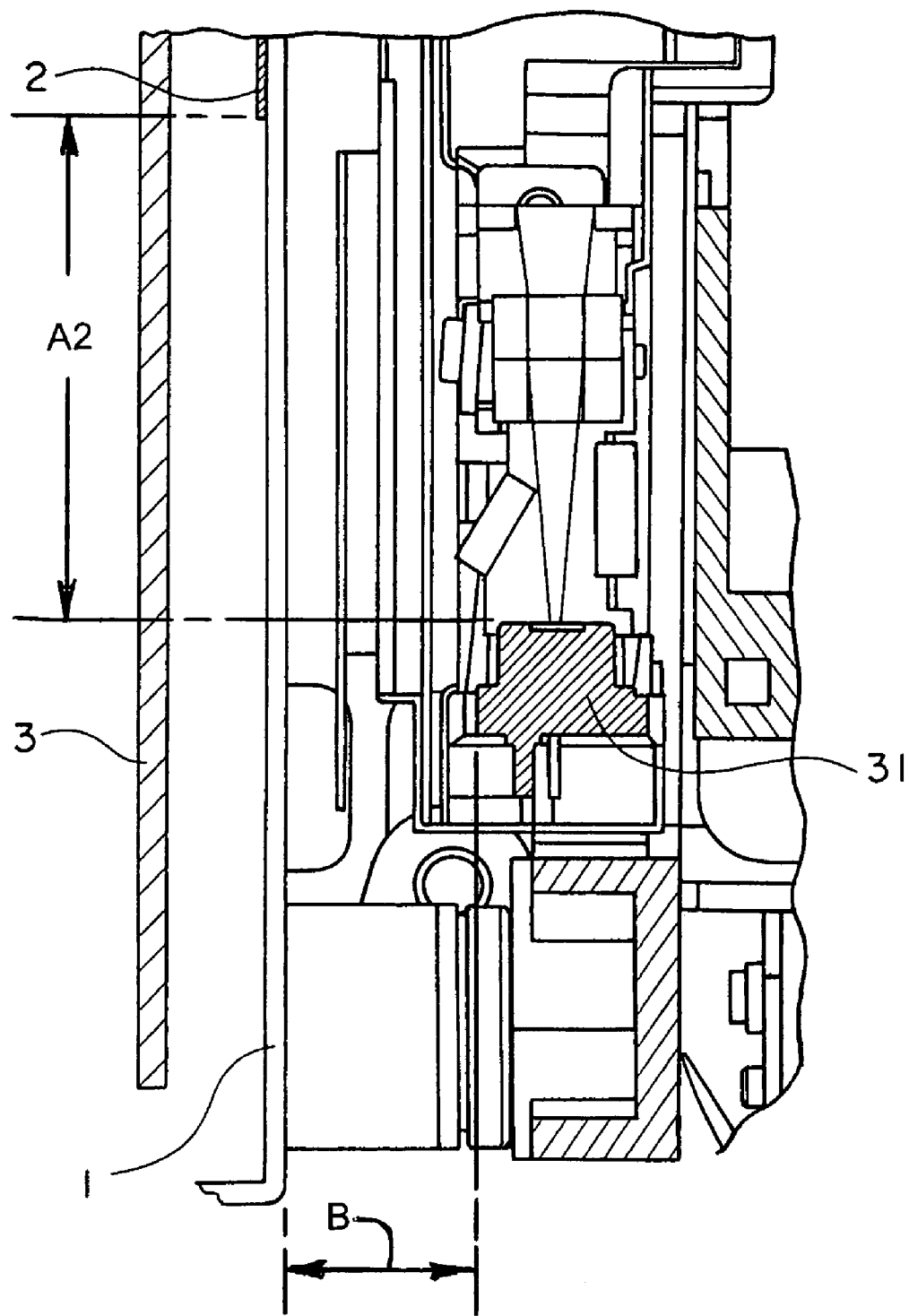
FIG. 4 is a longitudinal cross-sectional view of the part including a laser of the DVD camera according to the invention.

FIG. 4 is a longitudinal cross-sectional view of the part including the laser of the DVD camera.

Referring simultaneously to FIGS. 4 and 3 the arrangement of the laser 31 and the heat conducting member 2 is described. From the view point of temperature control the straight distance between the laser 31 and the heat conducting member 2 may preferably be large enough, however, to reduce thickness of the DVD camera the dimension B is required to be small enough. Therefore, the embodiments of the present invention adopt a configuration of the heat conducting member 2 with a cut away area such that the laser 31 and the heat conducting member 2 are spaced dimensions A1 and A2 in FIG. 3 apart each other. This configuration helps minimize a thermal effect over the laser 31 resulting from heat radiation from the heat conducting member 2 which may be prominent if the dimension B is reduced and materialize thin DVD cameras.

Figure 5:
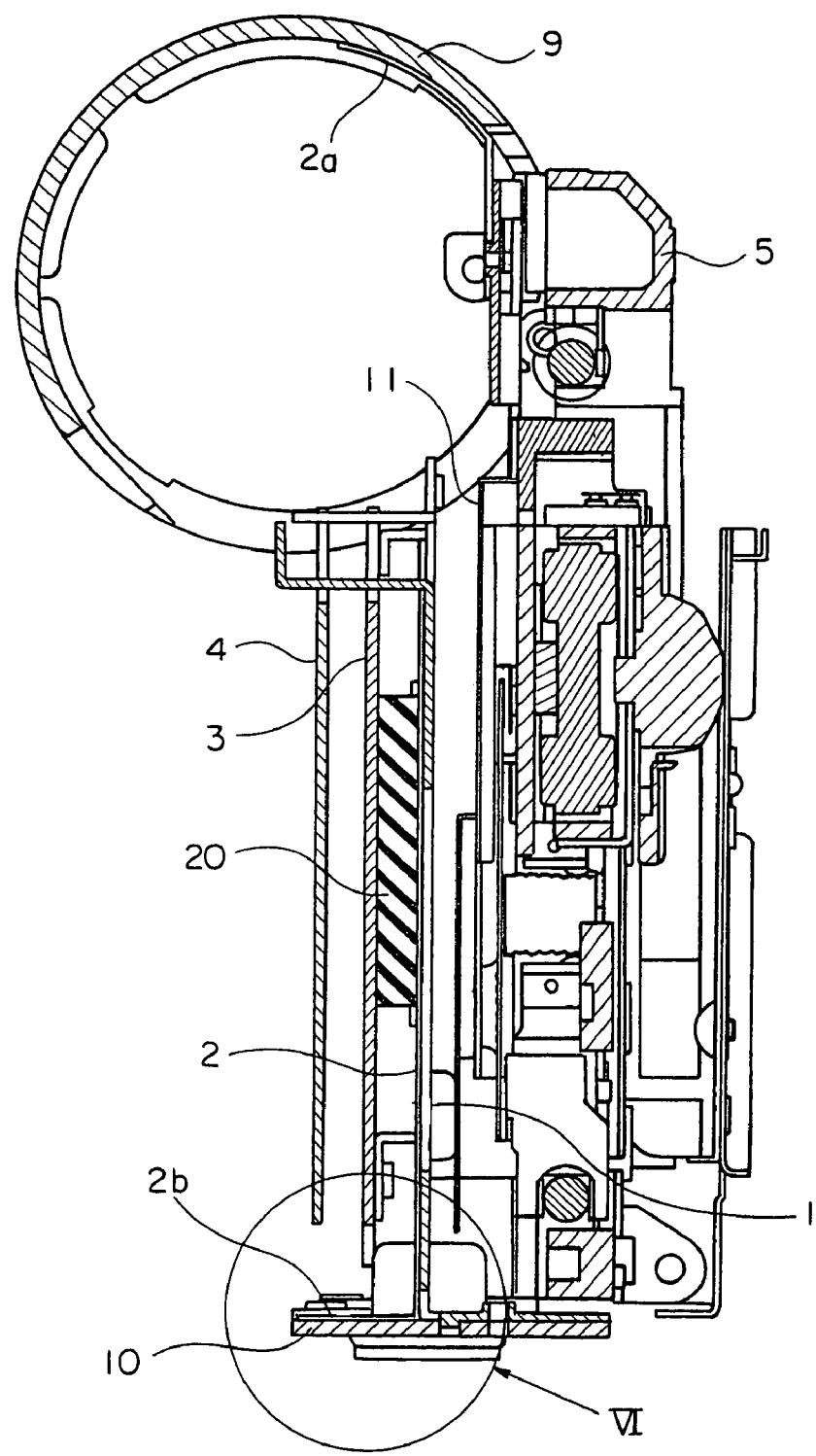
FIG. 5 is a longitudinal cross-sectional view of the DVD camera according to the invention.

Referring to FIG. 5 showing a longitudinal cross-sectional view of the DVD camera, the arrangement of the disc drive 11, the board 3, and the heat conducting member 2 will be described. The frame 1 carrying the heat conducting member 2 fixed thereto is mounted on the right case 5 and then the boards 3 and 4 are fixed to the frame 1. The disk drive 11 is assembled in the right case 5.

Between the heat conducting member 2 and the board 3 heat radiation rubber 20 having a high thermal conductivity is disposed to efficiently conduct heat of the heat generating element on the board 3 to the heat conducting member 2. Furthermore, the heat conducting part 2*a* is disposed in contact with the cover 9 and similarly the heat conducting part 2*b* is disposed in contact with the tripod piece 10 such that heat inside the DVD camera is conducted to the outer members including the cover 9 and the tripod piece 10 for dissipation to outside.

Figure 6:
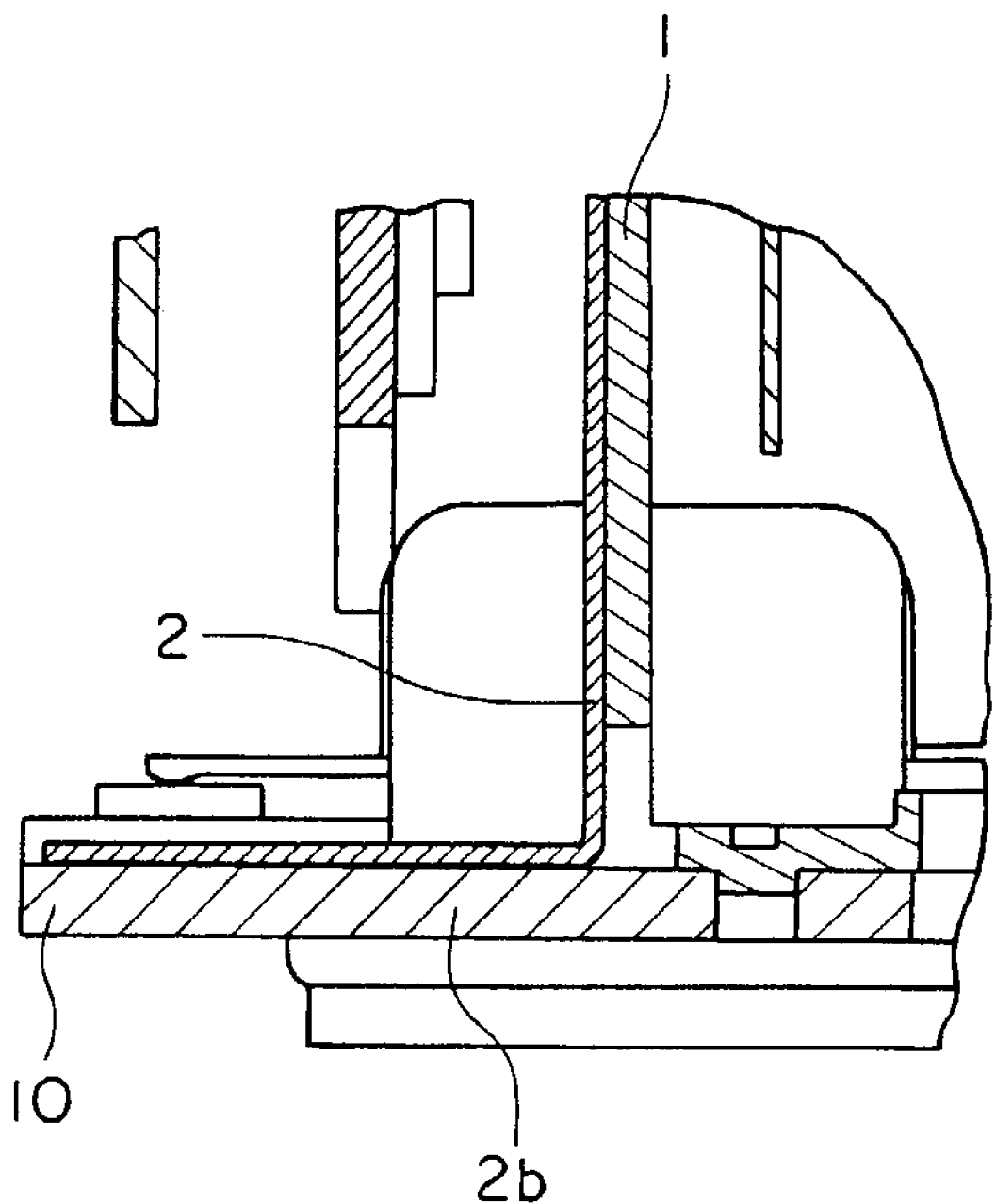
FIG. 6 is a partial enlargement of FIG. 5 as indicated by arrow VI, which shows around a tripod piece.

Referring to FIG. 6 showing a detail around the tripod piece 10, the arrangement of the tripod piece 10 and the heat conducting part 2*b* will be described. The heat conducting part 2*b* contacts with the tripod piece 10, one of the outer members, and is configured so as to be interposed therebetween in assembling to efficiently dissipate heat of the heat conducting member 2 to outside by means of the heat conducting part 2*b* and the tripod piece 10.

FIG. 7A shows a transverse section of the DVD camera and FIG. 7B shows a detail thereof. Referring to FIGS. 7A and 7B, the arrangement of the rear case 6 and the heat conducting part 2*c* will be described. The heat conducting part 2*c* contacts with the rear case 6, one of the outer members, and is provided with heat radiation rubber 21 having a high thermal conductivity in its recess. It is configured therebetween such that the heat radiation rubber 21 is interposed in assembling for efficient dissipation of heat of the heat conducting member 2 to outside by means of the heat conducting part 2*c* and the rear case 6. On the other hand, no heat radiation rubber is disposed on the heat conducting parts 2*a* and 2*b* to allow fabrication of the assembly of the central members into the casing of the DVD camera in the direction as indicated by the arrow in FIG. 2. Under the foregoing construction if heat radiation rubber pieces are disposed on the heat conducting parts 2*a* and 2*b*, such rubber pieces may be twisted in assembling the central members. Therefore, the heat radiation rubber is disposed only on the heat conducting part 2*c* facing the rear case 6.

Figure 8B:
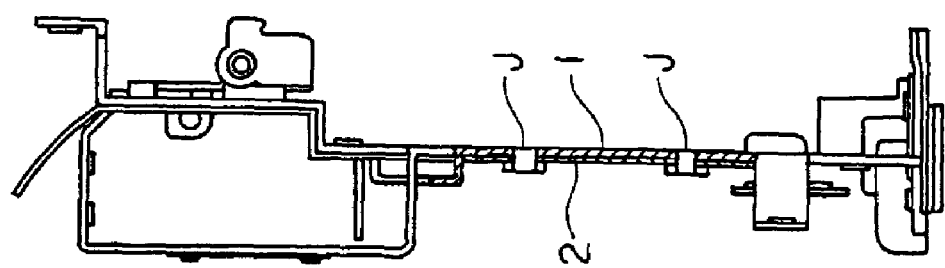
FIG. 8B is a cross-sectional view taken along the line indicated by arrows 8B—8B, which shows joints of the both members.
Figure 8A:
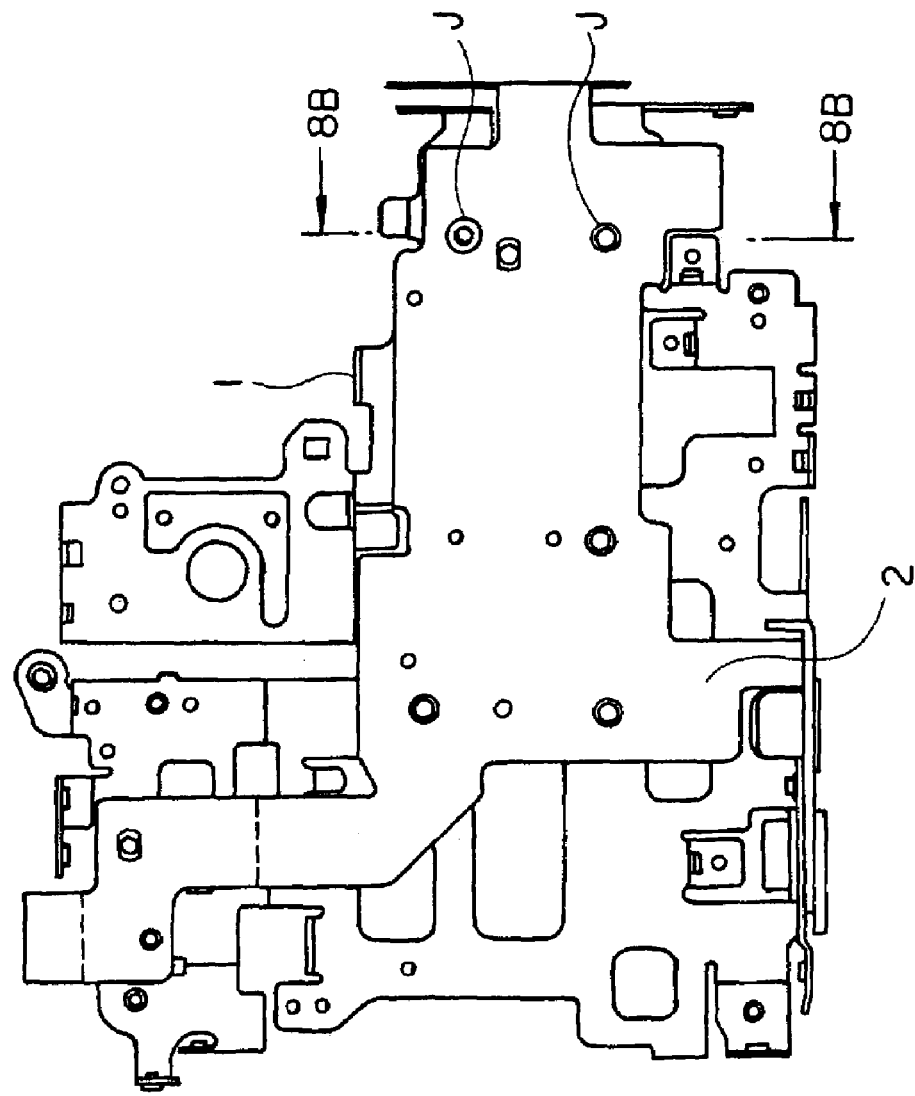
FIG. 8A shows the heat conducting member and the frame assembled with each other.
Figure 9A:
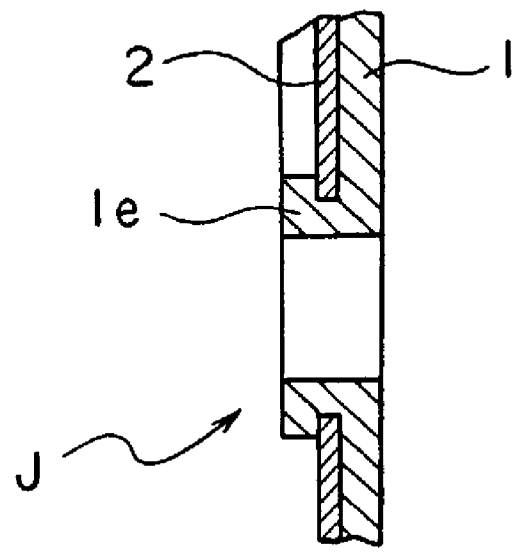
FIG. 9A an enlargement of the cross-section of one of the joints shown in FIG. 8B.
Figure 9B:
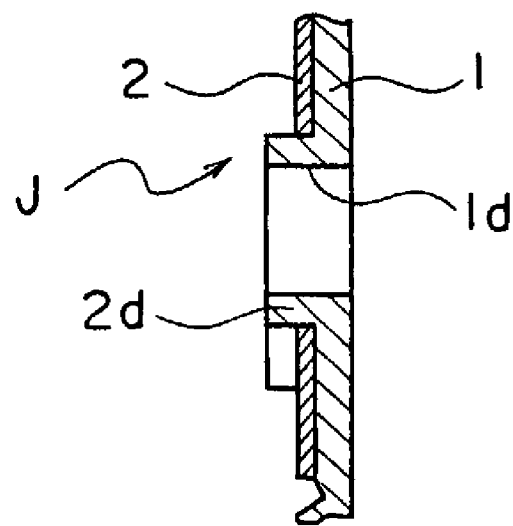
FIG. 9B shows a state of the joint in fabrication process of the heat conducting member and the frame, which corresponds to FIG. 9A.

Referring now simultaneously to FIGS. 8A and 8B and FIGS. 9A and 9B, joining methods between the heat conducting member 2 and the frame 1 will be described. FIG. 8A is a front view of the assembly of the heat conducting member 2 and the frame 1, FIG. 8B a section of the joining parts thereof, FIG. 9B a detailed view of one of the joining parts prior to connection, and FIG. 9A a detailed view of the joining part after connection.

A section taken along the line 8B—8B including the joining parts in FIG. 8A is FIG. 8B, wherein two joining parts are included. A frame bar ring 1*d* having a projection like a grommet is inserted into a heat conducting member hole 2*d* (refer to FIG. 9B) and then the top of the frame bar ring 1*d* is broken down into a frame caulking 1*e* to fix the heat conducting member 2 onto the frame 1 (refer to FIG. 9A). In the preferred embodiments a plurality of the joining parts are provided.

The method for joining the heat conducting member 2 and the frame 1 is not limited to the foregoing example and other methods including, but are not limited to, adhesion, bolting, welding and the like may be adopted.

Figure 10:
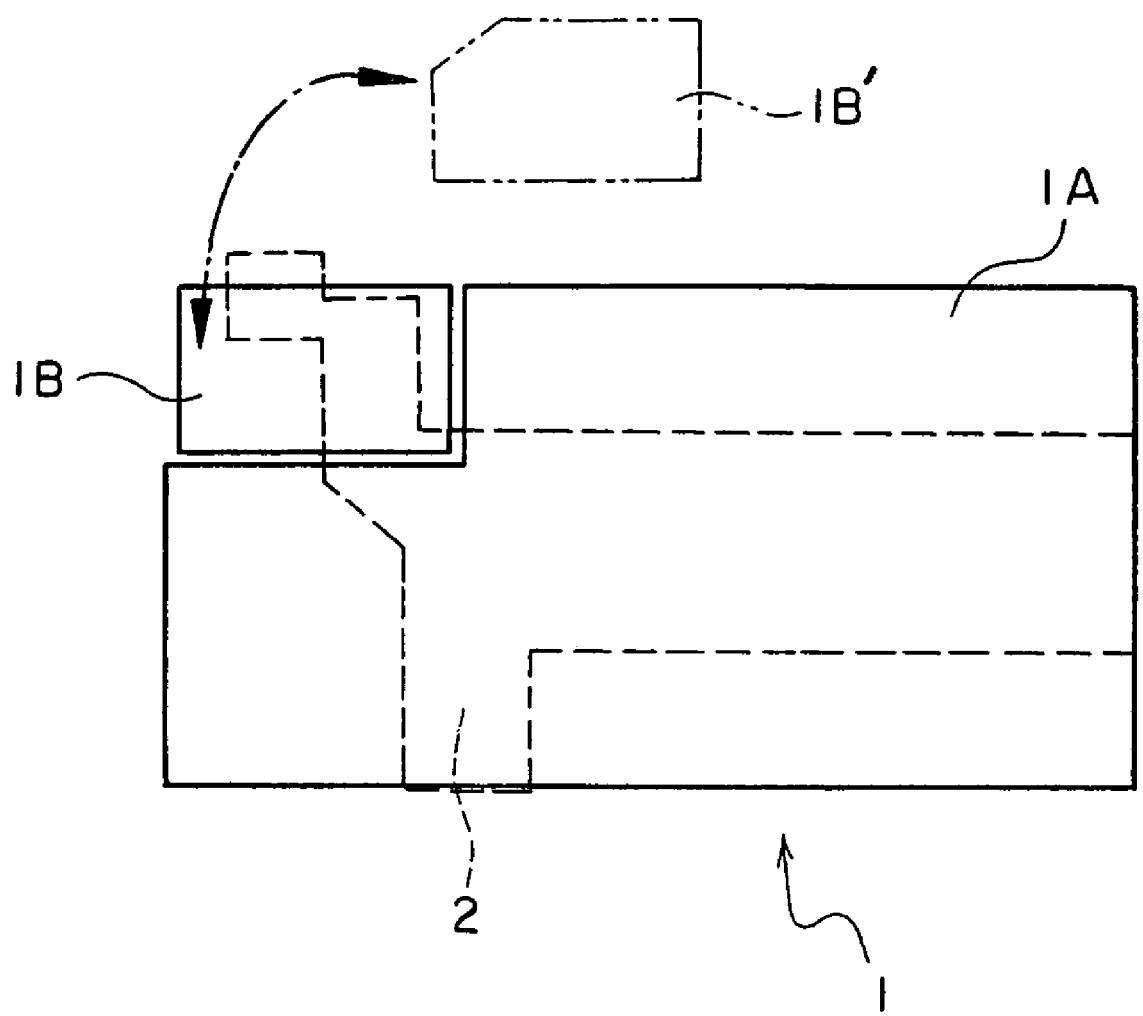
FIG. 10 shows a second embodiment of the invention.

Referring now to FIG. 10, a second embodiment will be described. In the first embodiment, the frame 1 has been described as a single plate. In the second embodiment, however, the frame 1 consists of a first frame 1A and a second frame 1 B as shown in FIG. 10. Even in a same model of cameras there is a case where different type of taking lenses is adopted. When this is the case, as is shown in FIG. 10 a frame part associated with lenses is separated into the second frame 1B, and the second frame 1B alone may be changed corresponding to the type of lenses for manufacture of the DVD camera while maintaining the first frame unchanged.

In other words, the second frame includes two different second frames 1B,1B' and depending on the type of lenses either one of the second frames 1B,1B' will be used.

By separating the frame into the first frame and the second frame, manufacture of frames will be facilitated and the production costs will be reduced.

As described heretofore, according to the present invention electronic devices can be reduced in their sizes.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electronic device comprising:
   a circuit board with an electronic circuit;
   a heat conducting means to conduct heat generated in the electronic circuit;
   an electronic element to be used under an ambient temperature lower than a temperature of the heat conducting means heated by heat generated in the electronic circuit;
   a support means to support the circuit board, the heat conducting means, and the electronic element; and
   an optical disk as an information recording medium,
   wherein the support means is positioned between the heat conducting means and the electronic element so that a first plane of projection of the heat conducting means on the support means and a second plane of projection of the electronic element on the support means do not overlap with each other,
   wherein the electronic element is a laser, and
   wherein the optical disk, the heat conducting means and the laser are so positioned that a third plane of projection of the heat conducting means on a plane parallel to the optical disk and a fourth plane of projection of the laser on the plane parallel to the optical disk do not overlap with each other.

2. An electronic device according to claim 1, wherein the heat conducting means comprises a projection at an end thereof, which projection is bent from the body of the heat conducting means generally perpendicularly to the plane parallel to the optical disk so as to have a bent shape, and which projection is in contact with a housing of the electronic device.

3. An electronic device according to claim 1, wherein the heat conducting means comprises a projection at an end thereof, which projection is bent from the body of the heat conducting means generally perpendicularly to the plane parallel to the optical disk so as to have a bent shape, and wherein there is arranged a highly heat conductive means, having a higher thermal conductivity than that of the heat conducting means, between the circuit board and the heat conducting means, or between a housing of the electronic device and the projection of the heat conducting means.

4. An electronic device according to claim 3, wherein the electronic device is a DVD camera which provides a DVD with information to be stored, the heat conducting means is made from a copper plate, and the support means is made from a stainless steel plate.

5. An electronic device according to claim 1, wherein the electronic device comprises a taking lens and a second support means to support the taking lens.

6. An electronic device according to claim 5, wherein the second support means is exchangeable in accordance with the type of the taking lens.

7. An electronic device according to claim 2, wherein the electronic device is a DVD camera, which provides a DVD with information to be stored, the heat conducting means is made from a copper plate, and the support means is made from a stainless steel plate.

* * * * *